United States Patent
Hettich

(10) Patent No.: US 10,378,572 B2
(45) Date of Patent: Aug. 13, 2019

(54) ANCHORING SYSTEM WITH A SLEEVE ELEMENT AND AN EXPANSION ELEMENT

(71) Applicant: Ludwig Hettich Holding GmbH & Co KG, Stramberg (DE)

(72) Inventor: Ulrich Hettich, Schramberg (DE)

(73) Assignee: LUDWIG HETTICH HOLDING GMBH & CO KG, Schramberg (DE)

( * ) Notice: Subject to any disclaimer, the term of this patent is extended or adjusted under 35 U.S.C. 154(b) by 488 days.

(21) Appl. No.: 15/029,576

(22) PCT Filed: Sep. 5, 2014

(86) PCT No.: PCT/EP2014/068934
§ 371 (c)(1),
(2) Date: Apr. 14, 2016

(87) PCT Pub. No.: WO2015/055350
PCT Pub. Date: Apr. 23, 2015

(65) Prior Publication Data
US 2016/0265572 A1    Sep. 15, 2016

(30) Foreign Application Priority Data

Oct. 15, 2013 (DE) .......................... 10 2013 111 390
Dec. 20, 2013 (DE) .......................... 10 2013 114 653

(51) Int. Cl.
*F16B 13/06* (2006.01)
*F16B 13/12* (2006.01)
*F16B 25/00* (2006.01)

(52) U.S. Cl.
CPC ........ *F16B 13/124* (2013.01); *F16B 25/0073* (2013.01)

(58) Field of Classification Search
CPC ........................... F16B 13/124; F16B 25/0073
(Continued)

(56) References Cited

U.S. PATENT DOCUMENTS 2,419,555 A * 4/1947 Fator ................... F16B 25/0021
411/387.3
3,232,163 A * 2/1966 Croessant ............. F16B 13/124
411/73
(Continued)

FOREIGN PATENT DOCUMENTS

DE           3916515       11/1990
DE        202009010888      2/2010
(Continued)

OTHER PUBLICATIONS

International Search Report and Written Opinion for PCT/EP2014/068934 dated Apr. 23, 2015 (8 pages).
(Continued)

*Primary Examiner* — Flemming Saether
(74) *Attorney, Agent, or Firm* — Patent Law Works LLP

(57) ABSTRACT

The invention relates to an anchoring system for anchoring in a drill hole. The anchoring system comprises a sleeve element and an expansion element. The sleeve element consists at least in some sections of a plastics material and is suitable for insertion into a drill hole. The expansion element comprises a threaded portion into which the sleeve element can be screwed and is suitable to radially expand the sleeve element during the screwing action. The anchoring system is characterized in that the threaded portion has a thread pitch which varies along the threaded portion.

31 Claims, 7 Drawing Sheets

(58) Field of Classification Search
USPC .................................. 411/55, 413, 415, 307
See application file for complete search history.

(56) References Cited

U.S. PATENT DOCUMENTS

| | | | | |
|---|---|---|---|---|
| 3,861,269 | A * | 1/1975 | Laverty | F16B 25/0031 |
| | | | | 411/413 |
| 6,287,044 | B1 * | 9/2001 | Huber | F16B 12/14 |
| | | | | 403/297 |
| 6,715,976 | B2 * | 4/2004 | Fischer | F16B 13/124 |
| | | | | 411/54 |
| 7,044,702 | B2 * | 5/2006 | Ho | B21H 3/027 |
| | | | | 411/307 |
| 7,938,606 | B2 * | 5/2011 | Zimmerer | F16B 13/124 |
| | | | | 411/412 |
| 9,151,314 | B2 * | 10/2015 | Hettich | F16B 33/02 |
| 2003/0026675 | A1 | 2/2003 | McGovern et al. | |
| 2005/0002751 | A1 * | 1/2005 | Holland | F16B 13/08 |
| | | | | 411/80.1 |

FOREIGN PATENT DOCUMENTS

| | | |
|---|---|---|
| EP | 0171745 | 2/1986 |
| EP | 1895173 | 3/2008 |

OTHER PUBLICATIONS

English translation of International Preliminary Report on Patentability dated Apr. 19, 2016 (6 pages).
German Office Action dated Jul. 9, 2014, cited in related DE 10 213 114 653.8 (6 pages).

* cited by examiner

Distance from the leading end in mm

Dowel of type 1

ANCHORING SYSTEM WITH A SLEEVE ELEMENT AND AN EXPANSION ELEMENT

CROSS REFERENCE TO RELATED APPLICATIONS

This application is a National Stage of International Application No. PCT/EP2014/068934 filed Sep. 5, 2014, entitled "VERANKERUNGS SYSTEM MIT EINEM HULSENELEMENT UND EINEM SPREIZELEMENT", which claims priority to German Applications 10 2013 111 390.7 filed Oct. 15, 2013, and 10 2013 114 653.8 filed Dec. 10, 2013, all of which are hereby incorporated by reference in their entirety.

FIELD OF THE INVENTION

The present invention lies in the field of anchoring and fastening technology. In particular, it relates to an anchoring system with a sleeve element and an expansion element for anchoring in a drill hole.

BACKGROUND OF THE INVENTION

Anchoring systems with expansion elements and sleeve elements made of a plastics material and corresponding methods for anchoring in an anchoring base, such as concrete or masonry for example, are known in the state of the art.

In order to make an anchor with an anchoring system of this kind, the sleeve element, such as a dowel, is first inserted into a drill hole in the anchoring base. After that, the expansion element, such as a steel screw, with a threaded portion is screwed into the sleeve element. The expansion element usually has an external diameter, such as a core diameter, which is at least in some sections larger than the internal diameter of the sleeve element. Because of this overwidth, as the screw is screwed in, the plastics material of the sleeve element is displaced radially outwards, so that an expansion pressure is created, with which the sleeve element is pressed against the wall of the drill hole.

The extraction resistance which has to be overcome in order to pull the sleeve element out of the drill hole is determined principally by the expansion pressure and the coefficient of friction between the sleeve element and the wall of the drill hole. The coefficient of friction is dependent both on the material of the anchoring base and the sleeve element, and on the surface properties or surface geometry of the wall of the drill hole and the external surface of the sleeve element.

Raising the overwidth of the expansion element diameter relative to the internal diameter of the sleeve element cannot increase the expansion pressure and hence the extraction resistance to an infinite extent, however, because the amount of heat introduced into the plastics material is intensified at the same time. The heat load can impair the properties of the plastics material, which in turn limits the increase in the extraction resistance.

SUMMARY OF THE INVENTION

The present invention is based on the problem of providing an anchoring system with a sleeve element and an expansion element with which greater extraction resistances can be generated than with comparable anchoring systems of the state of the art. A further problem consists in providing a method of fastening an item to an anchoring base using an anchoring system of this kind.

This problem is solved by an anchoring system in accordance with claim 1 and a method in accordance with claim 15. Advantageous further developments and embodiments are described in the dependent claims.

The anchoring system of the invention comprises a sleeve element and an expansion element. The sleeve element consists at least in some sections of plastics material and can be inserted into a drill hole. The expansion element comprises a threaded portion which can be screwed into the sleeve element, the expansion element being suitable for radially expanding the sleeve element during the screwing action. The threaded portion has a thread pitch which varies along the threaded portion.

When the threaded portion of the expansion element is screwed into the sleeve element, the sleeve element is not only expanded in the radial direction, but also, because of the thread pitch which varies along the threaded portion, tensioned in the axial direction as well. This tensioning of the sleeve element acting in the axial direction can lead to a shortening of the sleeve element, whereby additional expansion can be generated, which can lead to a further increase in the expansion pressure.

The axial tension generated in the sleeve element by the expansion element can also lead to relative displacements between the external surface of the sleeve element and the wall of the drill hole in the axial direction, so that a geometrical interlocking between the external surface of the sleeve element and the wall of the drill hole is caused. This results in an increase in the friction resistance between the wall of the drill hole and the expanded sleeve element.

Both the increase in the expansion pressure resulting from shortening the sleeve element, and the increase in the friction resistance contribute to enhanced extraction resistance.

A further advantage of the anchoring system of the invention is improved extraction rigidity. When an extraction load is applied to an anchor, the anchor usually yields to the load for a certain distance first, or overcomes a certain slip, before the anchor offers its maximum resistance to the load and ceases to yield to the load. The less this yielding is when pulling at an anchor, the greater is its extraction rigidity. The tension-induced relative displacement and the associated geometrical interlocking makes it possible to reduce the slip between the sleeve element and the wall of the drill hole. Thanks to the lower slip, the extraction rigidity can be improved.

In one embodiment, the threaded portion comprises a first portion with a first thread pitch and a second portion with a second thread pitch, the second thread pitch being smaller than the first thread pitch. Thanks to the different thread pitches in sections with different axial spacings, it is possible to ensure that the relative displacement between the sleeve element and the expansion element during screwing into different sections is different. In this embodiment, the relative displacement in the region of the first portion is greater than in the region of the second portion. As a result, the above-mentioned axial tensioning of the sleeve element can be achieved.

The first and/or second thread pitch can for its/their part be substantially constant. If, for example, both the first and the second thread pitch are constant, the sleeve element is tensioned above all between the first and second threaded portions, but not or at least to a lesser extent in the first and second threaded portions themselves.

In one embodiment, the first portion is located closer to a leading end of the expansion element than the second portion. Owing to its smaller thread pitch, the adjoining second portion is screwed less far into the sleeve element per revolution, or moves "more slowly" with respect to the sleeve element than the leading first portion. As a result, the sleeve element is tensioned axially towards the trailing end or a fixture to be fastened. This embodiment is particularly advantageous in the case of anchorings in concrete and in masonry, for example, because it is ensured that the sleeve is not drawn further into the drill hole, which is undesirable with concrete or masonry.

In another embodiment, the second portion is located closer to the leading end of the expansion element than the first portion, i.e. the portion with a comparatively small pitch. This embodiment is particularly advantageous for anchorings in porous materials, such as porous concrete or lightweight expanded concrete.

Between the first and second portions, the expansion element may also comprise a transitional section, in which the thread pitch reduces, and in particular reduces continuously, towards the second portion. Alternatively, however, a thread-free portion can be provided between the first and second portions. In this case, the threaded portion which can be screwed into the sleeve element comprises two partial threads of different pitch, which are separate from one another and which form the "first" and "second" threaded portions respectively. This variant is easier to manufacture than the variant in which the first and second threaded portions are connected by a transitional section. In a preferred embodiment, the length of the first portion is between 50% and 70%, especially about 60%, of the length of the threaded portion.

The length of the second portion is preferably between 10% and 30%, especially about 20%, of the length of the threaded portion.

The length of the transitional section is preferably between 10% and 30%, especially about 20%, of the length of the threaded portion.

The second thread pitch is preferably 85% or less, particularly preferably 70% or less, of the first thread pitch. In addition, the second thread pitch is preferably 40% or more, particularly preferably 55% or more, of the first thread pitch. It has been found that with these differences in pitch, high extraction values and high extraction rigidity can be achieved.

In one advantageous embodiment, the thread pitch has a local extremum, especially a local minimum, in the threaded portion in a position which is spaced apart both from the leading end and from the trailing end of the threaded portion. In the area of a local minimum of the thread pitch, the sleeve element can be compressed axially, as a result of which the sleeve element is effectively expanded, but at the same time geometrical interlocking can be produced between the external surface of the sleeve element and the wall of the drill hole.

The thread pitch can also have two or more local extrema, especially local minima. In particular, the value of the pitch can oscillate in the axial direction of the threaded portion, so that the sleeve element acquires alternate stretched and compressed portions.

In a particularly advantageous embodiment, the threaded portion comprises a portion of lower pitch of a certain length l, within which the pitch is smaller than at the respective ends of the threaded portion. In this portion of lower pitch, the sleeve element can then be compressed and thus lead to reliable purchase in the drill hole. Specifically, let it be assumed that the threaded portion has a length L, the pitch at the leading end of the threaded portion has a value $p_1$, at the trailing end a value $p_2$ and a minimum value of $p_{min}$, which is smaller than $p_1$ and $p_2$.

Then the following applies to the pitch p within the portion of low pitch:

$$p \leq p_{min} + \left(\frac{p_1 + p_2}{2} - p_{min}\right) * 0.7,$$

preferably $$p \leq p_{min} + \left(\frac{p_1 + p_2}{2} - p_{min}\right) * 0.4.$$

For the length l of the portion of low pitch, the situation is that $l \geq 0.2*L$, preferably $l \geq 0.4*L$ and $l \leq 0.9*L$, preferably $l \leq 0.75*L$.

In a further embodiment, the thread pitch does not run continuously over the entire threaded portion, but includes at least one abrupt change.

In a different embodiment, the thread pitch varies continuously along the threaded portion; in particular, it varies continuously along substantially the entire threaded portion.

The sleeve element is preferably a dowel consisting of a polyamide, especially the polyamide PA6 and/or the polyamide PA66.

The expansion element is preferably a screw, especially a steel screw.

BRIEF DESCRIPTION OF THE FIGURES

Further advantages and features of the present invention are explained in the following by way of example, with reference to the attached drawings, in which the same reference numerals are used for the same elements. The following are shown.

SUMMARY OF THE INVENTION

Figure 1A:
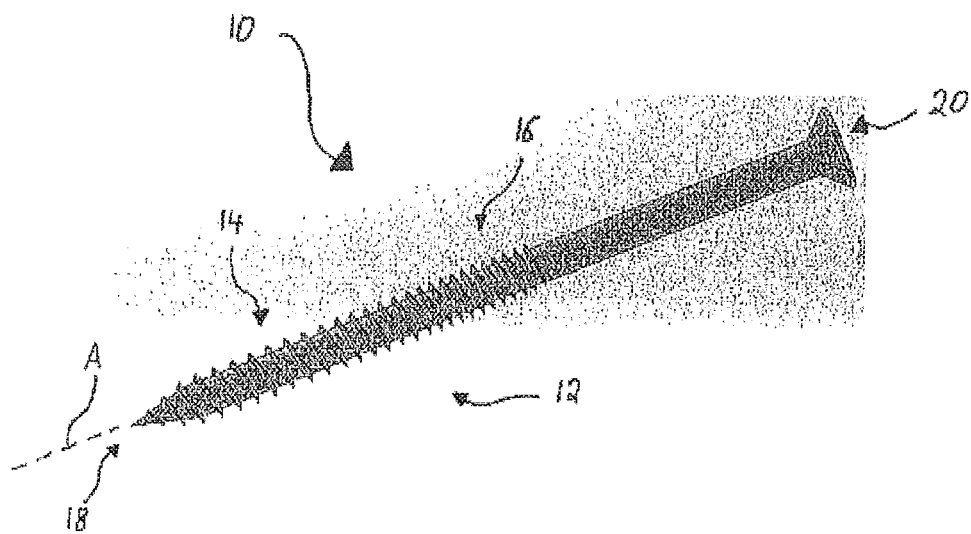
FIG. 1a shows an expansion element for an anchoring system of the invention in accordance with a preferred embodiment.

FIG. 1a shows an expansion element 10 of the invention in accordance with a preferred embodiment, which, for anchoring in a drill hole with an anchoring system of the invention (not shown), can be screwed into a sleeve element (not shown) made of plastics material, such as a dowel, wherein the sleeve element has to be inserted into the drill hole. Since the sleeve element can be a dowel, which is known per se, it is not explicitly shown in FIG. 1a. The expansion element 10 comprises a threaded portion 12 with a first portion 14 and a second portion 16. In the first portion 14, the threaded portion 12 has a first thread pitch, which is greater than a second thread pitch in the second portion 16. As can be seen in FIG. 1a, the expansion element 10 extends in an axial direction A and along that direction has a leading end 18 and an opposite rear or trailing end 20. In the embodiment of the expansion element 10 shown in FIG. 1a, the first portion 14 is located closer to the leading end 18 than the second portion 16. The expansion element 10 in this embodiment is thus formed by a screw with a variable thread pitch.

Figure 1B:
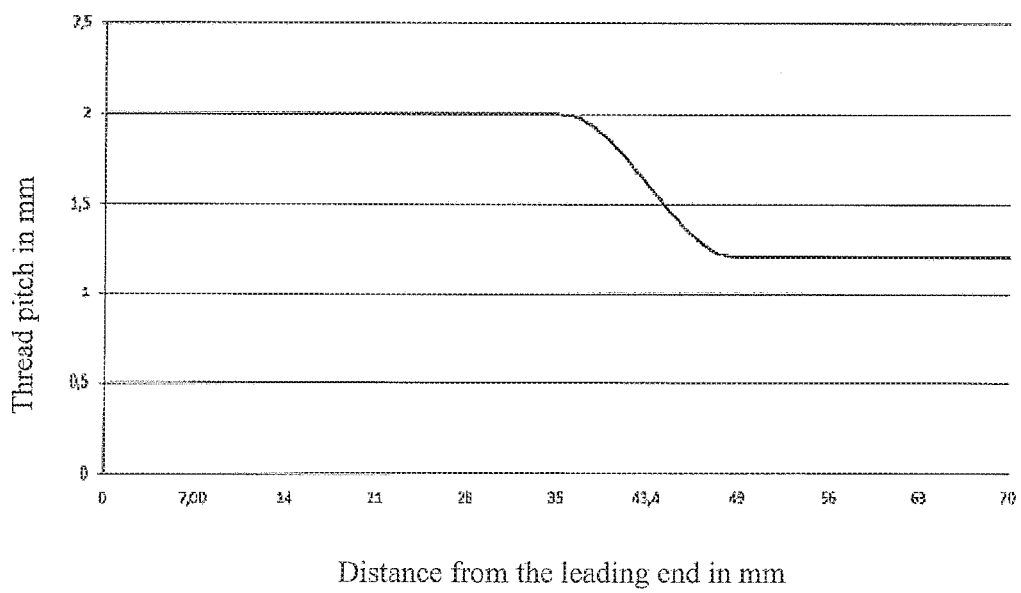
FIG. 1b shows the curve of the thread pitch along the threaded portion of the expansion element from FIG. 1a, FIG. 2a shows a section view of a conventional plastic dowel.

The diagram in FIG. 1b shows the curve for the thread pitch of the expansion element 10 from FIG. 1a, where the thread pitch is given in millimeters on the y axis and the distance from the leading end 18 is given in millimeters on the x axis. As can be seen from FIG. 1b, the first portion 14 has a length of about 35 mm and directly adjoins the leading end 18. The first thread pitch on the first portion 14 is constant and is 2 mm. Next to the first portion 14 is a transitional section, in which the thread pitch of 2 mm at a distance of 35 mm from the leading end 18 drops continuously to a value of 1.25 mm at a distance of about 50 mm from the leading end 18. Next to the transitional section, towards the rear end 20 of the expansion element 10, comes the second portion 16, in which the second thread pitch has a constant value of 1.25 mm. The total length of the threaded portion 12, which comprises the first portion 14, the second portion 16 and the transitional section between them, is 70 mm.

FIG. 2a shows a section view of a conventional plastic dowel 22, which constitutes an example of a sleeve element that can be part of a system of the invention.

FIGS. 2b-2d show a sequence of section views in which a conventional screw 24 is screwed into the dowel 22. In the conventional screw 24, the thread pitch is constant over the entire length of the threaded portion which is to be screwed into the dowel 22. In the sequence of FIGS. 2b-2d, it is possible to understand how the plastic dowel 22 is expanded by screwing in the screw. In particular, it can be seen in FIG. 2d that when the screw 24 is screwed in completely, the plastic dowel 22 is expanded radially uniformly in the entire region which receives the threaded portion of the screw 24.

By way of comparison, FIG. 2e shows a case in which a screw 10 of the kind shown in FIG. 1a is used together with the plastic dowel 22. In this embodiment, the first portion, which has the greater thread pitch, is located closer to the leading end of the screw 10 than the second portion, in which the thread pitch is smaller. Owing to its smaller thread pitch, the trailing second portion is screwed less far into the dowel 22 per revolution, or moves "more slowly" with respect to the dowel 22 than the leading first portion. As a result, the sleeve element is tensioned axially towards the trailing end. This can be seen in FIG. 2e from the fact that the dowel 22 is shortened compared to its original length (FIG. 2a), i.e. it is compressed, as a result of which an expansion is caused which is greater than that of FIG. 2d. The additional axial tensioning of the dowel material compared to the conventional system of FIG. 2d, which leads to a relative displacement between the external surface of the dowel 22 and the wall of the drill hole (not shown in FIG. 2e), also produces the above-mentioned "interlocking" of the external surface of the dowel 24 and the wall of the drill hole, which in turn leads to an increase in the friction resistance between the wall of the drill hole and the expanded dowel 22.

In the following, the efficiency of an anchoring system of the invention and that of an anchoring system of the state of the art are described and compared to one another. The results of the efficiency tests are illustrated in graph form in FIGS. 3 to 5. In total, three anchoring systems of the invention and three anchoring systems from the state of the art were tested, with the expansion element 10 described above being used for each anchoring system of the invention, as was explained in more detail with reference to FIGS. 1 and 2, and a conventional screw being used for each anchoring system of the state of the art, the conventional screw differing from the expansion element 10 of FIGS. 1 and 2 substantially only in that it did not have a variable thread pitch, but rather a constant pitch over its entire threaded portion.

Anchoring systems with three different sleeve elements were tested, namely with dowels from three different manufacturers, so that three different anchoring systems of the invention and three different anchoring systems of the state of the art were tested in each case. The dowels of the three different manufacturers will be referred to in the following as type 1, type 2 and type 3. According to what has just been explained, each of the three anchoring systems of the invention tested has a corresponding anchoring system of the state of the art, which uses a dowel of the same type and a screw with the same core diameter but a constant thread pitch. The dowel types used for the experiments consist of the polyamides PA6 or PA66, which are plastics materials approved in Germany for dowels.

Dowels with a diameter of 10 mm were used for the experiments, the dowels being inserted into a drill hole about 55 mm deep in an anchoring base of concrete. In order to produce the anchoring systems to be tested, the expansion elements 10 of the invention and conventional screws from the state of the art were screwed into the inserted dowels. In order to test the quality of the anchoring systems, a measuring apparatus was used to pull the expansion elements 10 and the screws out of the anchoring base at a substantially constant pulling speed. At the same time, the distance was measured which the expansion element 10 or the screw had travelled with respect to the starting position, and the force was measured which was applied to the expansion element 10 or the screw at the respective distance travelled. The result of each measurement, or each extraction attempt is a measured curve, which can be represented in a force-distance diagram.

Measured force-distance curves are illustrated in FIGS. 5a to 5c in force-distance diagrams, the curves each having been measured for the anchoring system of the invention and for an anchoring system of the state of the art respectively. The force in kN is plotted on the y axis in each case, and the distance travelled in millimeters with respect to the starting position is shown on the x axis.

Figure 5:
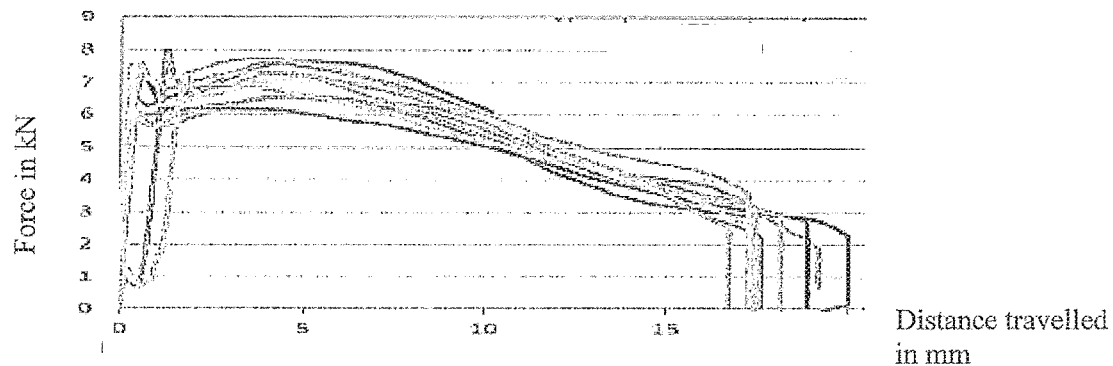
Figure 5:
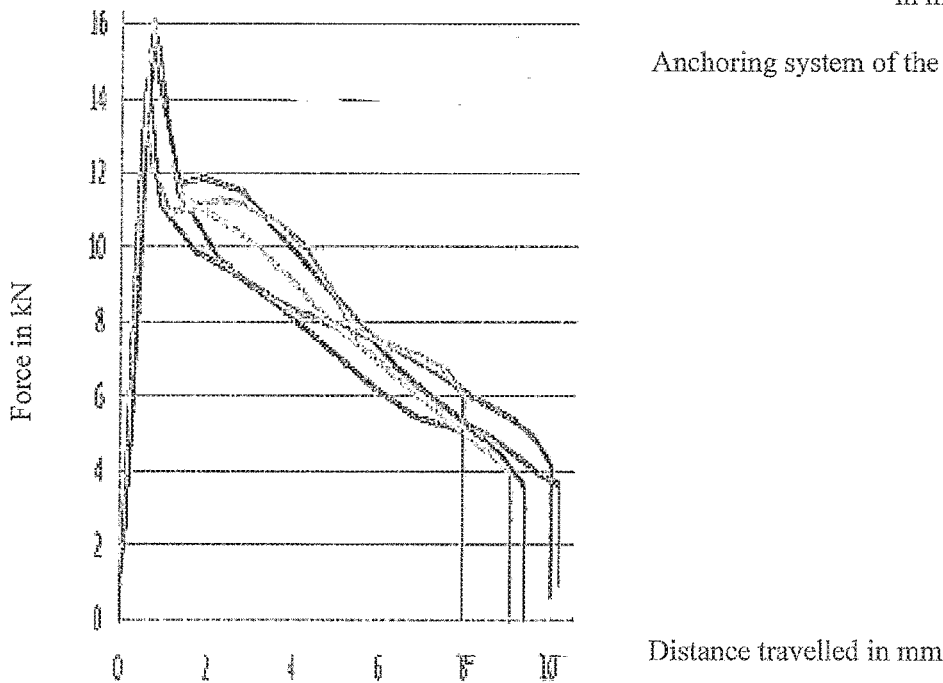
Figure 5:
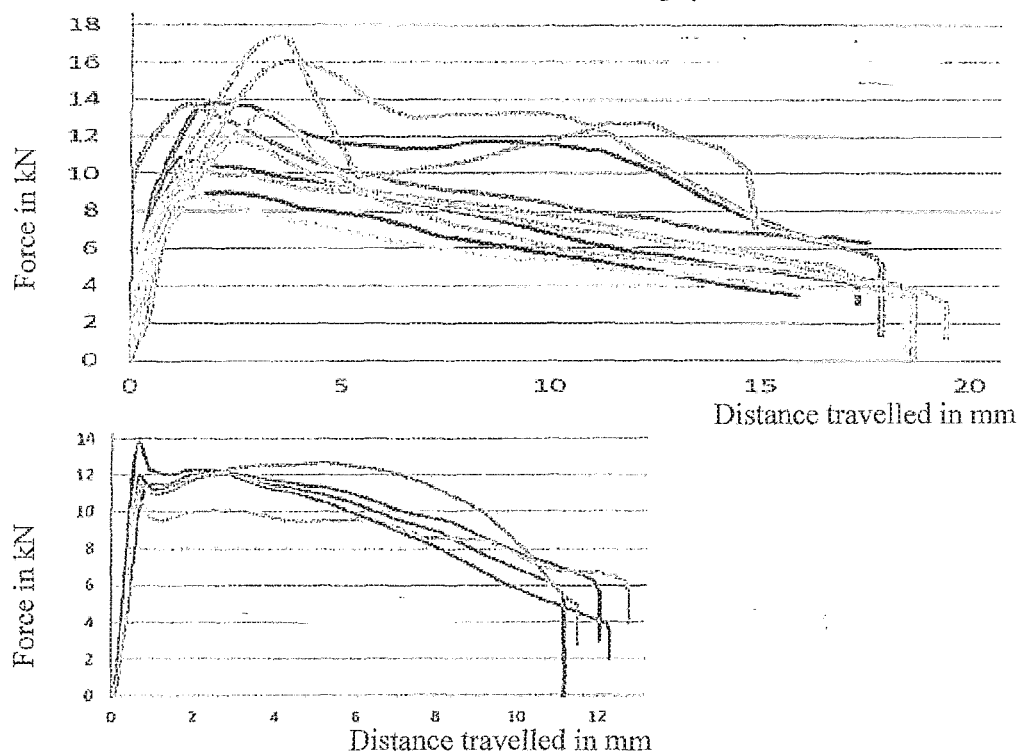
Figure 5:
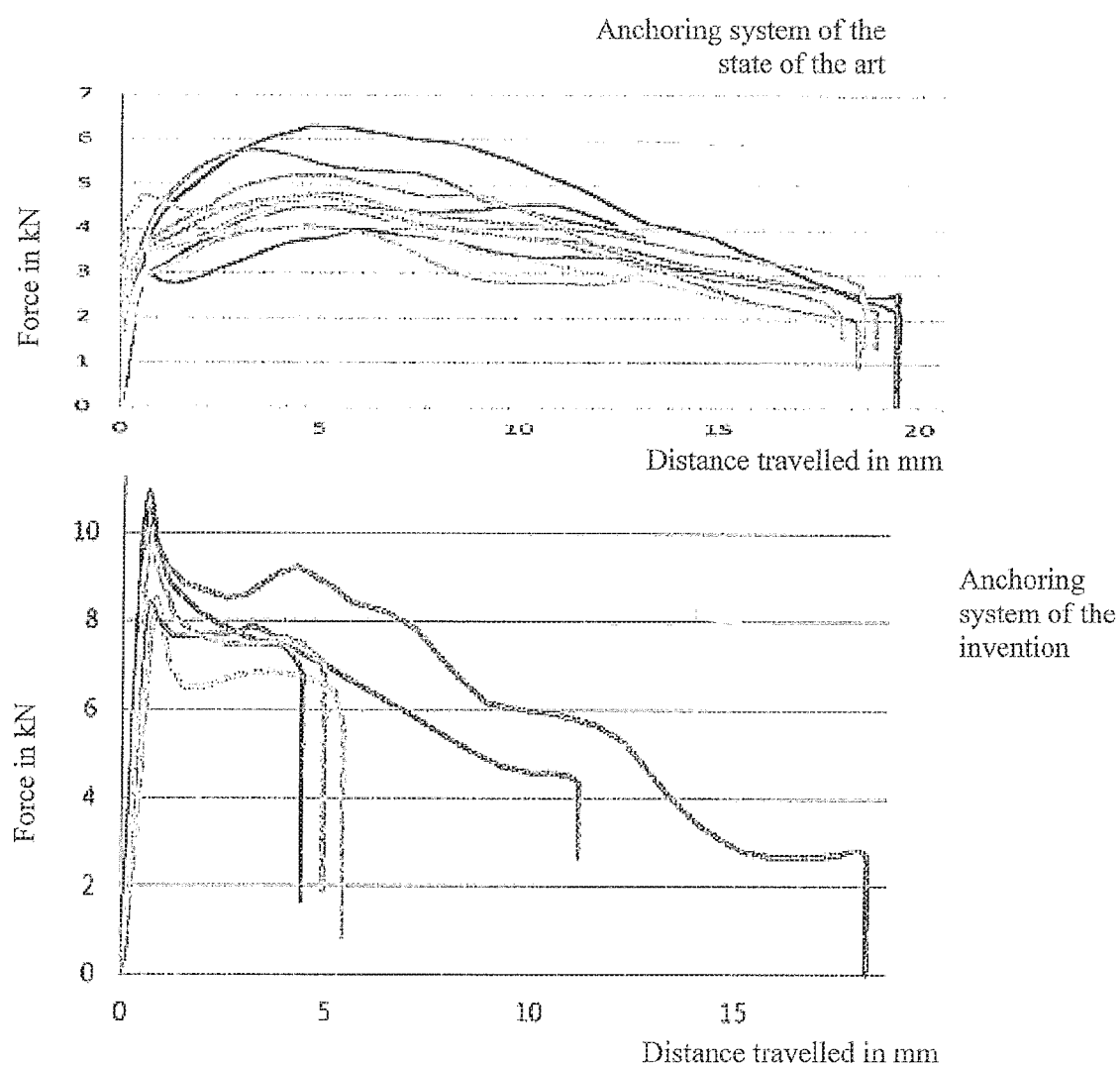

FIG. 5a shows measurements for anchoring systems with a dowel of type 1, FIG. 5b shows measurements for anchoring systems with a dowel of type 2, and FIG. 5c shows measurements for anchoring systems with a dowel of type 3. In FIGS. 5a to 5c, measurements for anchoring systems of the state of the art are shown in the upper force-distance diagram in each case, and measurements for anchoring systems of the invention are shown in the lower diagram in each case. In FIGS. 5a to 5c, ten extraction measurements with a screw of the state of the art (at the top in FIGS. 5a to 5c in each case) are shown for each dowel type, and five extraction measurements with the expansion element 10 from FIG. 1a are shown (at the bottom in FIGS. 5a to 5c in each case). As can be seen from the measurement curves in FIG. 5, the tensile force applied when pulling out at a constant speed increases sharply directly after pulling begins, and reaches a maximum value. When pulling continues, the tensile force applied gradually declines. At the right-hand end of the measurement curves illustrated, the force applied drops abruptly and sharply. That is the point at which the anchoring finally fails and comes loose.

Figure 3:
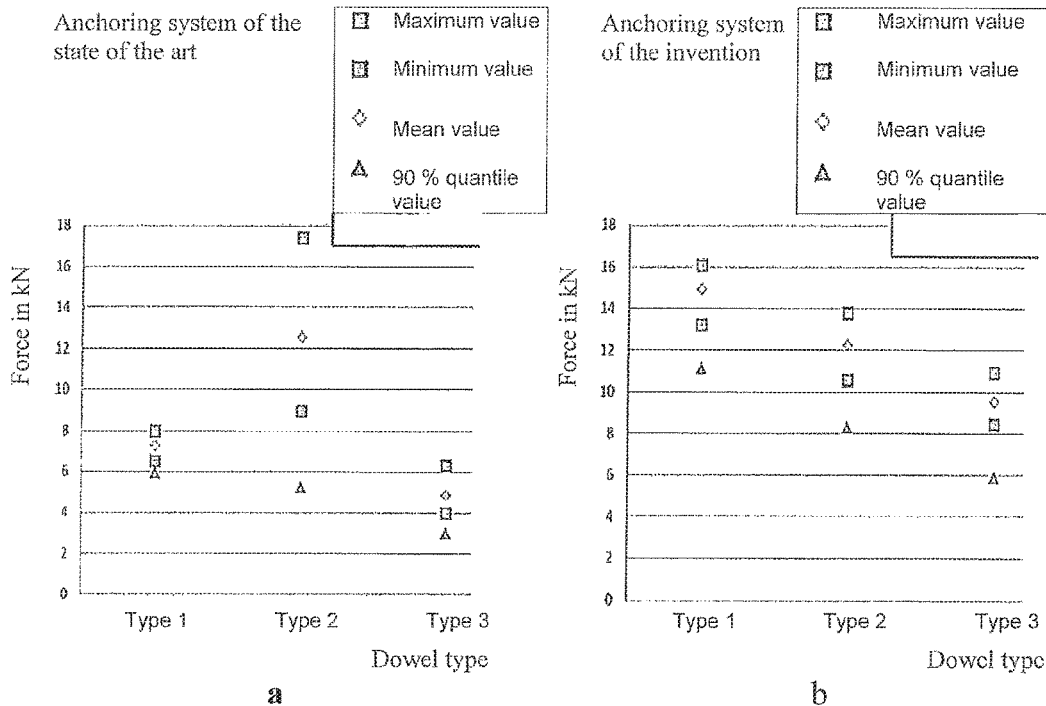
FIGS. 3a and 3b show values determined from experiments for extraction forces for three different dowel types, where the values shown in FIG. 3a were determined for an anchoring system according to the state of the art and the values shown in FIG. 3b were determined for an anchoring system of the invention with the expansion element from FIG. 1a, FIGS. 4a and 4b show values determined from experiments for travel values for three different dowel types, where the values shown in FIG. 4a were determined for an anchoring system according to the state of the art and the values shown in FIG. 4b were determined for an anchoring system of the invention with the expansion element from FIG. 1a, FIGS. 5a to 5c show force-distance diagrams with measurement curves from which the values shown in FIGS. 3 and 4 were determined, where curves for an anchoring system of the state of the art are shown in the top diagram in each case and curves for an anchoring system of the invention with the expansion element from FIG. 1a are shown in the bottom diagram in each case, and where the curves in FIG. 5a were measured with a dowel of a first type, the curves in FIG. 5b were measured for a dowel of a second type and the curves in FIG. 5c were measured for a dowel of a third type.

For each of the six series of measurements shown in FIGS. 5a) to c) for the six different anchoring systems, the maximum values of the extraction force were determined, which in each case means ten values for the maximum extraction force for each of the three anchoring systems of the state of the art tested and five values in each case for the maximum extraction force for each of the three anchoring systems of the invention tested. FIG. 3 shows two diagrams, in which the maximum value, the minimum value, the mean value and the 95% quantile value of the values determined in each case for the maximum extraction force achieved are shown for each anchoring system tested. FIG. 3a shows these values for the three anchoring systems of the state of the art, and FIG. 3b shows these values for the three anchoring systems of the invention. The types of the associated anchoring systems are given on the x axes in each case, and the force in kN on the y axis.

The quantile value is used to supply further measurement values for the parameter on the basis of a measured value distribution and can serve as a quality criterion for the measured system. The 95% quantile value indicates the value from a measured value distribution for which there is a 90% degree of probability that a further measurement will not yield a lower result. The 95% quantile value F was calculated according to the following formula:

$$F = \bar{x} - k \times \sigma$$

There, $\bar{x}$ is the mean of the underlying measurement values, $\sigma$ is the standard deviation of the underlying measurement values and k is a factor which has the value of 2.57 for ten measuring experiments or measurement values, and the value of 3.4 for five measuring experiments or measurement values.

Referring to FIG. 3, it can be seen that the 95% quantile values determined for the maximum extraction force in the anchoring systems of the invention are considerably and significantly greater than the quantile values determined for the corresponding anchoring systems of the state of the art with the same dowel type. The quantile values determined are compared in the following table:

| Dowel type (right)/<br>Anchoring system (bottom) | Type 1 | Type 2 | Type 3 |
|---|---|---|---|
| State of the art | 5.94 | 5.24 | 2.99 |
| Invention | 11.1 | 8.31 | 5.91 |

95% quantile value for the maximum extraction force in kN

The maximum value of the extraction force which the measuring apparatus measured during each of the measurements mentioned, or which the measuring apparatus had to apply while pulling, is at the same time the force with which the measured anchoring system opposed the pulling. The greater that force is, the greater is the extraction resistance of the system. Referring to the values shown at the top in the table, it becomes clear that with the aid of a varying thread pitch in an expansion element, the extraction resistance for an anchoring system can be increased considerably.

Figure 4:
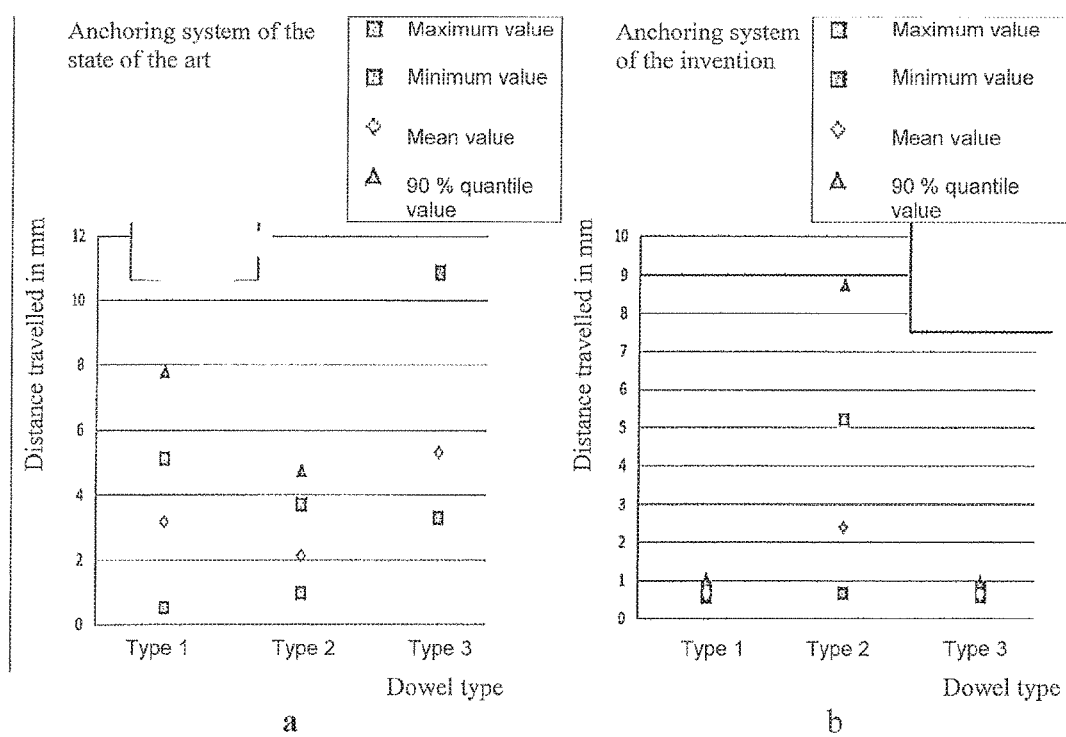

As was described earlier for the maximum extraction force, for each of the measurement curves shown in FIG. 5, the value for the distance was determined which the expansion element 10 or the screw travelled, beginning at the starting position until the maximum extraction force was reached. That distance can be used as a measure of the extraction rigidity. In line with the description earlier, the maximum value, the minimum value, the mean value and the 95% quantile value of the associated values for the distance travelled until the maximum extraction force was reached were determined for each of the six anchoring systems tested. Those values are illustrated in FIG. 4, while FIG. 4a shows the respective values for the three anchoring systems of the state of the art, and FIG. 4b shows the respective values for the anchoring systems of the invention. The 95% quantile values for the distance travelled until the maximum force was reached are shown in the following table:

| Dowel type (right)/<br>Anchoring system (bottom) | Type 1 | Type 2 | Type 3 |
|---|---|---|---|
| State of the art | 3.16 | 2.12 | 5.30 |
| Invention | 1.02 | 8.74 | 0.94 |

95% quantile value for the distance travelled until the maximum extraction force was reached in mm On the basis of the values shown above and the illustrations in FIGS. 4 and 5, it can be seen that with the anchoring system of the invention, the difference in the distance travelled by the expansion element 10 until the maximum force was reached could be reduced considerably in the case of the dowels of type 1 and type 3. Those anchoring systems thus exhibit a comparatively high extraction rigidity. The embodiment with the dowel of type 2 exhibits a special behaviour in that, while the force rises rapidly here too in the course of a relatively short distance of less than 1 mm, it does not then drop continuously, but in some cases only reaches the global maximum after somewhat more than 5 mm. That does not, however, alter the fact that even this embodiment exhibits a basically rigid extraction behaviour, in which within a distance of about 1 mm a value is already reached which corresponds at least almost to the maximum.

The measurements performed clearly demonstrate that with the anchoring system of the invention, the extraction resistance and the extraction rigidity can be improved.

Figure 2:
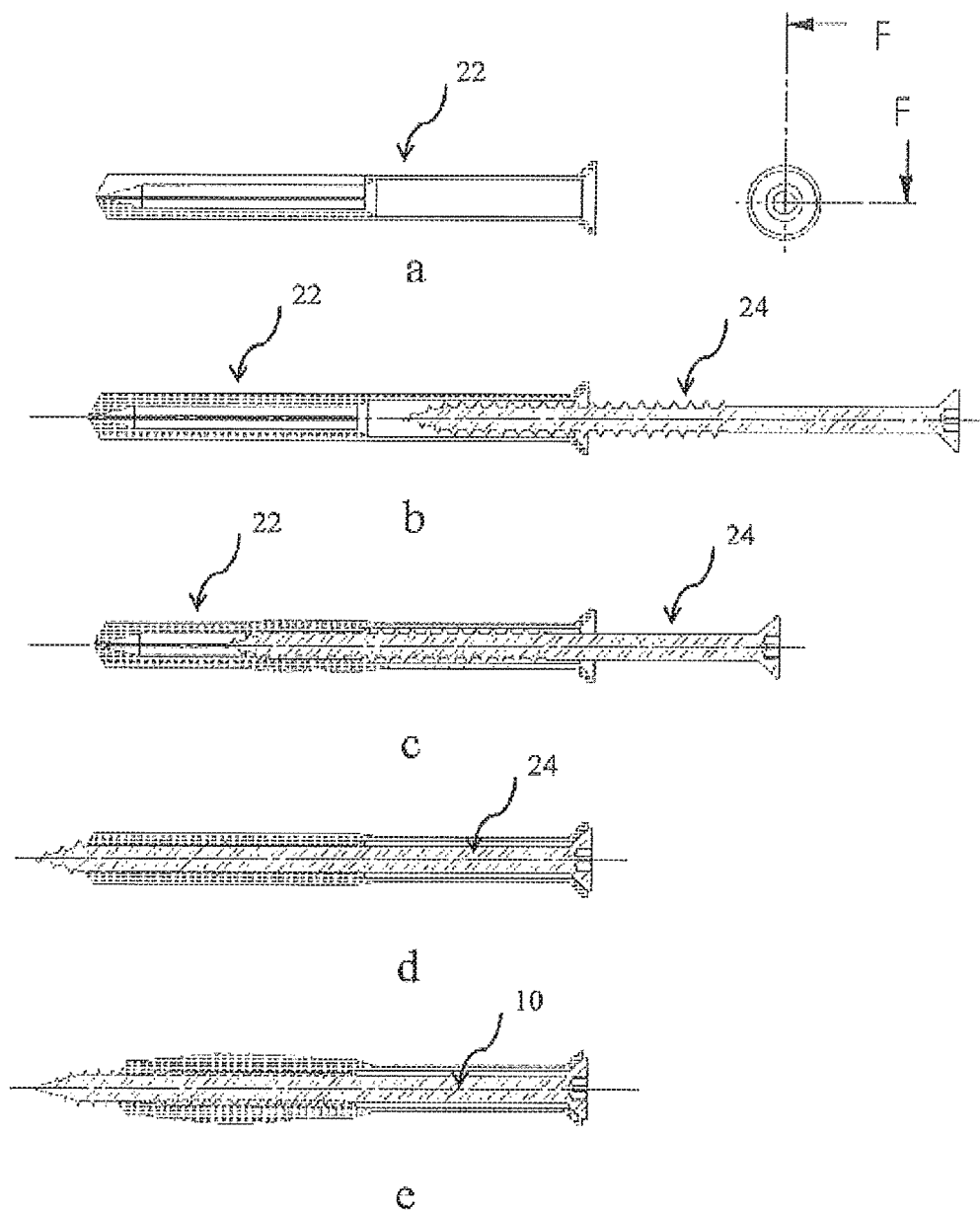
FIGS. 2b-d show a sequence of section views of the plastic dowel from FIG. 2a, into which a conventional screw is screwed in order to expand it.
FIG. 2e shows a section view of the plastic dowel from FIG. 2a, into which a screw similar to the screw 10 from FIG. 1a has been screwed.

It should be noted that the expansion element 10 from FIGS. 1 and 2 is merely one example of an embodiment of the invention and that the invention also comprises other embodiments with different curves for the thread pitch.

Figure 6:
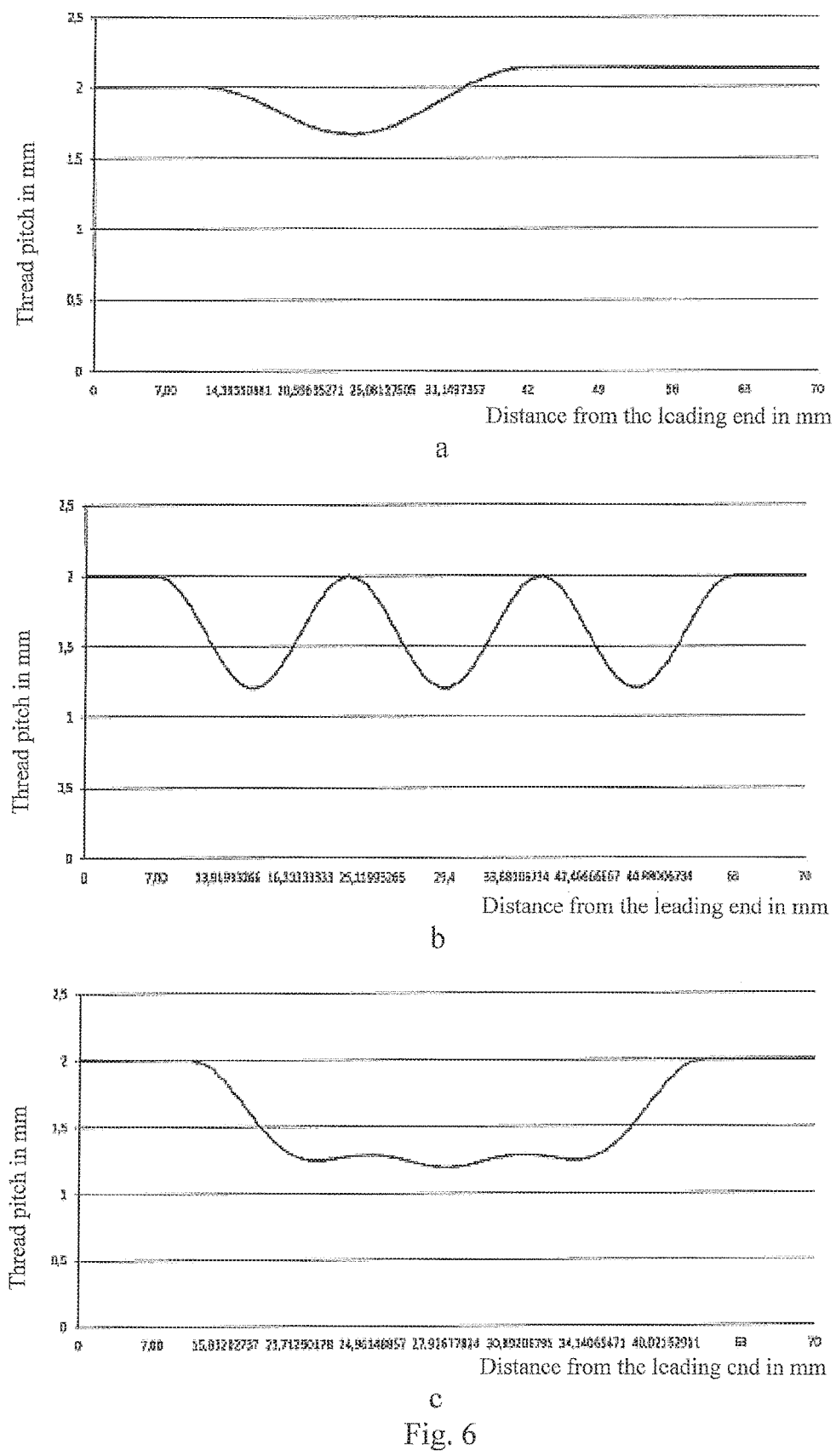
FIGS. 6a to 6c show curves of the thread pitch of expansion elements according to further embodiments along their threaded portions.

Thread pitches for other exemplary embodiments of the invention are shown in FIGS. 6a to 6c. As can be seen from FIG. 6, the thread pitch at the leading end can be smaller than at the rear end of the threaded portion (FIG. 6a), can vary in some sections with a periodical curve (FIG. 6b) or can be substantially identical in the leading region of the threaded portion and the opposite rear region of the threaded portion and can be smaller in some sections in between (FIG. 6c). In many cases, it is advantageous for the thread pitch to have a local minimum in a position that is not located at the edge of the threaded portion. In the area of the local minimum of the thread pitch, the sleeve element is compressed, which produces additional expansion and geometrical interlocking, or "clawing", between the sleeve element and the wall of the drill hole. A local minimum of this kind can be found in all three embodiments of FIGS. 6a, 6b and 6c.

FIG. 6b shows an embodiment with a plurality of local minima, specifically with a periodical modulation of the thread pitch. In this way, a number of compressed locations are produced along the length of the sleeve.

FIG. 6c shows an embodiment in which there is a section with a lower pitch, in which the pitch is lower over a particular length 1 than at the ends or the mean value of the pitches at the ends of the threaded portion.

As is shown in FIG. 6c, this section with a lower pitch can account for a considerable part of the total length of the threaded portion, such as more than 20%, preferably even 40%.

It should also be noted that the embodiments described above should be regarded as mere examples and not as limiting the invention. The features described can be important in any combination.

LIST OF REFERENCE NUMERALS

10 Expansion element
12 Threaded portion
14 First portion
16 Second portion
18 Leading end
20 Rear end
22 Sleeve element
24 Conventional screw

The invention claimed is:

1. An anchoring system for anchoring in a drill hole, comprising:
a sleeve element which consists at least in some sections of plastics material and can be inserted into the drill hole, and
an expansion element comprising a threaded portion which can be screwed into the sleeve element, the expansion element being suitable for radially expanding the sleeve element during a screwing action,
wherein the threaded portion has a thread lead which varies along the threaded portion.

2. The anchoring system of claim 1, wherein the threaded portion comprises a first portion with a first thread lead and a second portion with a second thread lead, the second thread lead being smaller than the first thread lead.

3. The anchoring system of claim 2, wherein at least one of the first thread lead and the second thread lead is substantially constant.

4. The anchoring system of claim 2, wherein the first portion is located closer to a leading end of the expansion element than the second portion.

5. The anchoring system of claim 2, wherein the second portion is located closer to a leading end of the expansion element than the first portion.

6. The anchoring system of claim 2, wherein the threaded portion also comprises a transitional section which is located between the first and second portions and in which the thread lead reduces continuously towards the second portion.

7. The anchoring system of claim 6, wherein the length of the transitional section is between 10% and 30% of the length of the threaded portion.

8. The anchoring system of claim 2, wherein the length of the first portion is between 50% and 70% of the length of the threaded portion.

9. The anchoring system of claim 2, wherein the length of the second portion is between 10% and 30% of the length of the threaded portion.

10. The anchoring system of claim 2, wherein the second thread lead is 85% or less, of the first thread lead.

11. The anchoring system of claim 2, wherein the second thread lead is 70% or less of the first thread lead.

12. The anchoring system of claim 2, wherein the second thread lead is 40% or more of the first thread lead.

13. The anchoring system of claim 2, wherein the second thread lead is 55% or more of the first thread lead.

14. The anchoring system of claim 1, wherein the thread lead has a local extremum in the threaded portion in a position which is spaced apart both from a leading end and from a trailing end of the threaded portion.

15. The anchoring system of claim 14, wherein the thread lead has two or more local extrema, in particular local minima.

16. The anchoring system of claim 1, wherein the threaded portion has a length L and the thread lead at a leading end of the threaded portion has a value $p_1$, at a trailing end of the threaded portion a value $p_2$ and a minimum lead $p_{min}$, which is smaller than $p_1$ and p2,
wherein the threaded portion has a section of low lead, within which the following applies to the thread lead p:

$$p \leq p_{min} + \left(\frac{p_1 + p_2}{2} - p_{min}\right) * 0.7,$$

Preferably $$p \leq p_{min} + \left(\frac{p_1 + p_2}{2} - p_{min}\right) * 0.4,$$

wherein the following applies for the length 1 of the section of low lead:
1 ≥0.2×L and 1 ≤0.9×L.

17. The anchoring system of claim 16, wherein the following applies for the length 1 of the section of low lead:
1 ≥0.4×L and 1 ≤0.75×L.

18. The anchoring system of claim 1, wherein the thread lead includes at least one abrupt change.

19. The anchoring system of claim 1, wherein the thread lead varies continuously along substantially the entire threaded portion.

20. The anchoring system of claim 1, wherein the sleeve element is a dowel made of a polyamide.

21. The anchoring system of claim 1, wherein the expansion element is a screw.

22. The anchoring system of claim 1, wherein the expansion element has an external diameter which is at least in some sections larger than an internal diameter of the sleeve element, and wherein because of this overwidth, as the threaded portion of the expansion element is screwed in, the plastic material of the sleeve element in these at least some sections is displaced radially outwards, so that an expansion pressure is created with which the sleeve element is pressed against the wall of the drill hole.

23. A method of fastening an item to an anchoring base, comprising:
    inserting a sleeve element which consists at least in some sections of plastics material, into a drill hole, and
    fastening the item to the anchoring base with the aid of an expansion element comprising a threaded portion, by screwing the expansion element into the sleeve element in order to expand the sleeve element radially,
    wherein the threaded portion has a thread lead which varies along the threaded portion.

24. The method of claim 23, wherein the threaded portion comprises a first portion with a first thread lead and a second portion with a second lead, the second thread lead being smaller than the first thread lead.

25. The method of claim 24, wherein one or both of the first thread lead and the second thread lead are substantially constant.

26. The method of claim 24, wherein the first portion is located closer to a leading end of the expansion element than the second portion.

27. The method of claim 24, wherein the second portion is located closer to a leading end of the expansion element than the first portion.

28. The method of claim 24, wherein the threaded portion also comprises a transitional section which is located between the first and second portions and in which the thread lead reduces continuously towards the second portion.

29. The method of claim 24, wherein the length of the first portion is between 50% and 70% of the length of the threaded portion.

30. The method of claim 24, wherein the length of the second portion is between 10% and 30% of the length of the threaded portion.

31. The method of claim 23, wherein the expansion element has an external diameter which is at least in some sections larger than an internal diameter of the sleeve element, and wherein because of this overwidth, as the threaded portion of the expansion element is screwed in, the plastic material of the sleeve element in these at least some sections is displaced radially outwards, so that an expansion pressure is created with which the sleeve element is pressed against the wall of the drill hole.

* * * * *